US012655872B2

(12) United States Patent
Santangelo et al.

(10) Patent No.: US 12,655,872 B2
(45) Date of Patent: Jun. 16, 2026

(54) BEARING UNIT WITH RETAINING CAGE

(71) Applicant: Aktiebolaget SKF, Gothenburg (SE)

(72) Inventors: Piero Santangelo, Turin (IT); Giuseppe Grassi, Pinerolo (IT); Enzo Amico, Moncalieri (IT); Giuseppe Sardella, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 33 days.

(21) Appl. No.: 18/757,027

(22) Filed: Jun. 27, 2024

(65) Prior Publication Data

US 2025/0012323 A1 Jan. 9, 2025

(30) Foreign Application Priority Data

Jul. 7, 2023 (IT) ........................ 102023000014283

(51) Int. Cl.
| | |
|---|---|
| *F16C 19/06* | (2006.01) |
| *F16C 33/38* | (2006.01) |
| *F16C 33/41* | (2006.01) |
| *F16C 33/44* | (2006.01) |
| *F16C 33/46* | (2006.01) |

(52) U.S. Cl.
CPC .......... *F16C 33/3812* (2013.01); *F16C 19/06* (2013.01); *F16C 33/412* (2013.01); *F16C 33/418* (2013.01); *F16C 33/44* (2013.01); *F16C 33/4611* (2013.01); *F16C 2226/76* (2013.01)

(58) Field of Classification Search
CPC .... F16C 19/06; F16C 33/3812; F16C 33/412; F16C 33/418; F16C 33/44; F16C 33/4611; F16C 2226/76
See application file for complete search history.

(56) References Cited

U.S. PATENT DOCUMENTS

| | | | |
|---|---|---|---|
| 4,239,304 A | 12/1980 | Teruaki | |
| 4,865,473 A * | 9/1989 | De Vito | .............. F16C 33/4694 |
| | | | 384/577 |

FOREIGN PATENT DOCUMENTS

| | | | |
|---|---|---|---|
| DE | 102014211341 A1 * | 12/2015 | .......... F16C 33/3812 |
| FR | 2876169 A1 | 4/2006 | |

(Continued)

OTHER PUBLICATIONS

DE10201014211341_A1_Description.*

(Continued)

*Primary Examiner* — Phillip A Johnson
(74) *Attorney, Agent, or Firm* — Stinson LLP

(57) ABSTRACT

A bearing unit (30) has a central axis (X) of rotation and a retaining cage (40) for a plurality of rolling bodies (34) interposed between a radially outer ring (31) and a radially inner ring (33). The retaining cage (40) has a plurality of movable sectors (50) that are made of polymeric material, are identical to one another, and are arranged circumferentially adjacent to one another. Each movable sector (50) has at the ends a first engagement portion (51) and a second engagement portion (52) that are configured to define a dovetail joint between the first engagement portion (51) of a first movable sector (50') and the second engagement portion (52) of a second movable sector (50"), circumferentially adjacent to the first movable sector (50') to create a circumferential and radial constraint as well as a degree of axial freedom between the two movable sectors (50', 50").

18 Claims, 3 Drawing Sheets

(56)         References Cited

FOREIGN PATENT DOCUMENTS

| | | |
|---|---|---|
| GB | 1162570 A | 8/1969 |
| JP | H08121487 A | 5/1996 |

OTHER PUBLICATIONS

Examination Report of the National Intellectual Property Office of Italy in Application No. 102023000014283, dated Jan. 31, 2024; 14pgs.

* cited by examiner

BEARING UNIT WITH RETAINING CAGE

CROSS-REFERENCE TO RELATED APPLICATION

This application claims priority to Italian Application No. 102023000014283, filed Jul. 7, 2023, the entirety of which is hereby incorporated by reference.

FIELD

The present disclosure relates to a bearing unit with a retaining cage.

BACKGROUND

Known bearing units with a retaining cage comprise:
a radially outer ring,
a radially inner ring,
a plurality of rolling bodies, in particular balls, interposed between the two inner and outer rings to enable the relative rotation thereof, and
a retaining cage, which holds the balls in respective circumferential positions and in turn comprises a circular base frame and a plurality of tenons that are integral with the frame, are spaced apart circumferentially, and define in pairs a plurality of cavities to hold respective balls.

The base frame is a continuous structural element that extends circumferentially, forms a solid base, and provides the cage as a whole with the rigidity required to hold the balls spaced apart equally from one another. The tenons on the other hand, which contain and hold the balls together, must exhibit substantially elastic behaviour so as to spread apart to enable insertion of the balls, and to then close substantially about the balls to hold said balls inside the related cavities.

These retaining cages are usually used in high-velocity, high-vibration bearing units for use both in the automotive sector, for example in powertrains, and in the industrial sector, for example in machine tool spindles, and are typically made by injection moulding a polymer material, including to compensate for poor lubrication conditions.

When a bearing unit with a retaining cage, such as of the known type described above, is used in an application where there are high axial loads or misalignments between the shaft and the bearing unit, it is possible for the retaining cage to be not insignificantly deformed during the relative rotation between the rings of the bearing unit, to such an extent that the tenons are no longer able to hold the balls inside the cavities, resulting in the absolutely unwanted disassembly of the bearing unit.

SUMMARY

One objective of the present disclosure is to provide a bearing unit with a retaining cage that does not have the drawback described above.

Consequently, the present disclosure describes a bearing unit with a retaining cage having movable sectors, having the features set out in the independent claim attached to the present description.

Other preferred and/or particularly advantageous embodiments of the present disclosure are described according to the features set out in the attached dependent claims.

BRIEF DESCRIPTION OF THE DRAWINGS

The present disclosure is described below with reference to the attached drawings, which show non-limiting example embodiments of same, in which.

DETAILED DESCRIPTION

Figure 1:
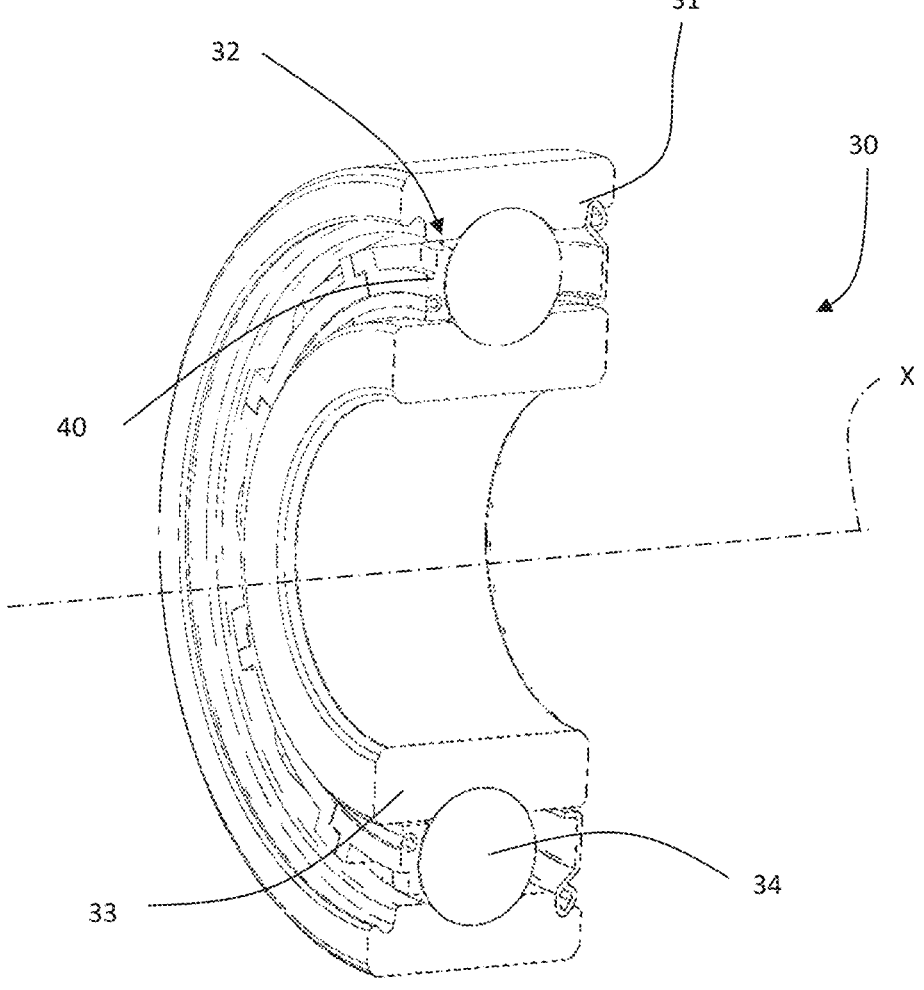
FIG. 1 is a partial cross section of a first preferred embodiment of a bearing unit according to the present disclosure.

In FIG. 1, reference sign 30 denotes a bearing unit as a whole, according to a preferred embodiment of the present disclosure.

The bearing unit 30 has a central axis X of rotation and comprises:
a radially outer ring 31 that is preferably but not necessarily stationary,
a radially inner ring 33 that is preferably but not necessarily rotary,
a row 32 of rolling bodies 34 interposed between the radially outer ring 31 and the radially inner ring 33, and
a cage 40 for holding the rolling bodies 34 of the row 32 of rolling bodies in position.

Throughout the present description and in the claims, terms and expressions indicating positions and orientations, such as "radial" and "axial", are to be understood with reference to the central axis X of rotation of the bearing unit 30, unless otherwise specified. For the sake of simplicity, the term "ball" may be used by way of example in the present description and in the attached drawings instead of the more generic term "rolling body", and the same reference signs shall be used.

Figure 2:
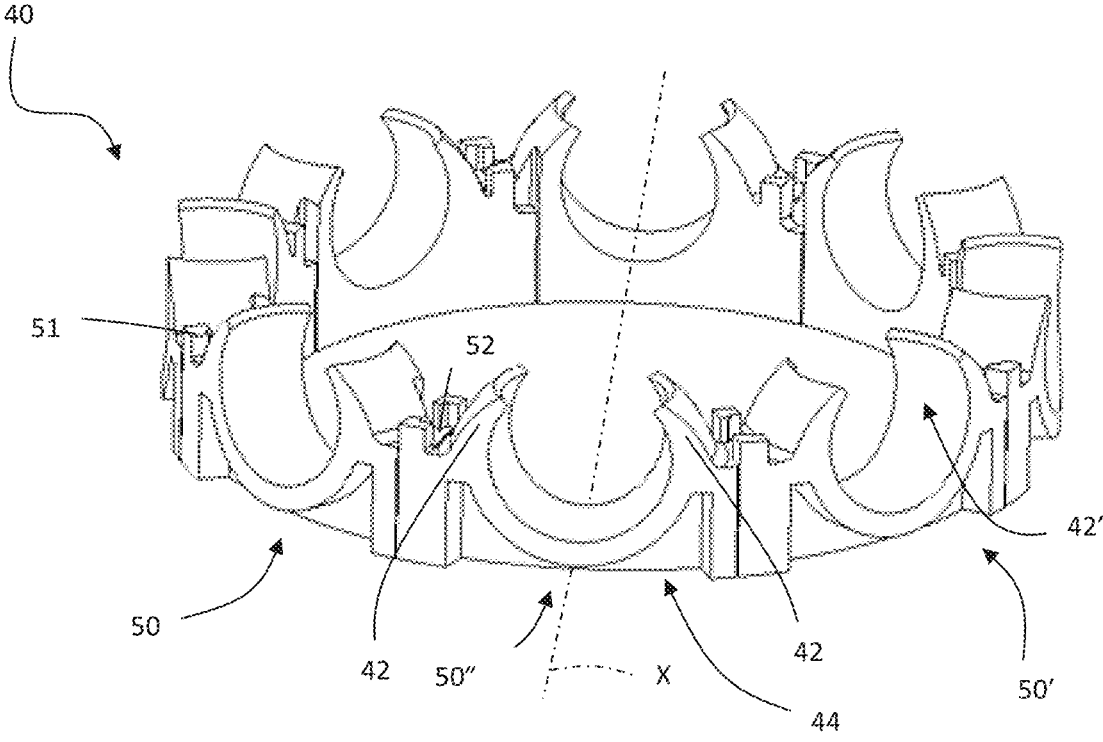
FIG. 2 is an axonometric view of the retaining cage of the bearing unit in FIG. 1.

With reference to FIG. 2, the cage 40 according to the present disclosure comprises a plurality of movable sectors 50 that are made of polymeric material, are identical to one another, and are arranged circumferentially adjacent to one another. Each mobile sector has, at the ends, a first engagement portion 51 and a second engagement portion 52. The two engagement portions are shaped to define a dovetail joint so that the first engagement portion 51 of a first movable sector 50' can be connected to a second engagement portion 52 of a second movable sector 50" circumferentially adjacent to the first movable sector 50' to define a circumferential and radial constraint between the two movable sectors 50', 50". The same connection is reproduced for each pair of adjacent movable sectors so as to define a single cage 40, such as the one illustrated in FIG. 2, made of polymer material in which all of the movable sectors 50 are bound circumferentially and radially together.

Each movable sector 50 also has:
a base rib 41, which is defined by a flattened annular structural member extending about the axis X,
a pair of tenons 42 spaced apart circumferentially and having an arcuate shape. The two tenons 42 have respective concave surfaces 42' facing one another, a cavity 43 for holding a respective ball 34. The cavity 43 is defined by the pair of tenons 42.

Once all of the movable sectors 50 have been connected circumferentially, the cage 40 then has:

a base frame 44 that extends through 360° and is formed by the base rib 41 of each movable sector 50, a plurality of pairs of tenons 42, each pair of tenons belonging to a movable sector 50, and a plurality of cavities 43, each cavity defined by a respective pair of tenons 42, which holds all of the respective balls 34 of the row of balls 32.

As mentioned above, the dovetail joint between the two engagement portions 51, 53 of two circumferentially adjacent movable sectors 50', 50" defines a circumferential and radial constraint between the two adjacent movable sectors. However, this joint affords the two adjacent sectors a degree of freedom (within certain limits, as explained below) in the axial direction, enabling the movable sectors to slide axially in relation to one another in response to different axial loads and/or misalignments to which they may be subjected when in operation.

A cage 40 with movable sectors 50 that are independent of one another in the axial direction, as in the present disclosure, provides a notable advantage in applications where there are misalignments of the shaft on which the bearing unit is mounted or where there are high axial loads that are not uniformly distributed in the circumferential direction. Indeed, this cage enables a single movable sector to move axially to follow the movement caused by misalignment and/or axial load, while the other movable sectors remain in position. This prevents the cage 40 from being deformed, obviating the risk of the balls coming out of the respective cavities.

Figure 3:
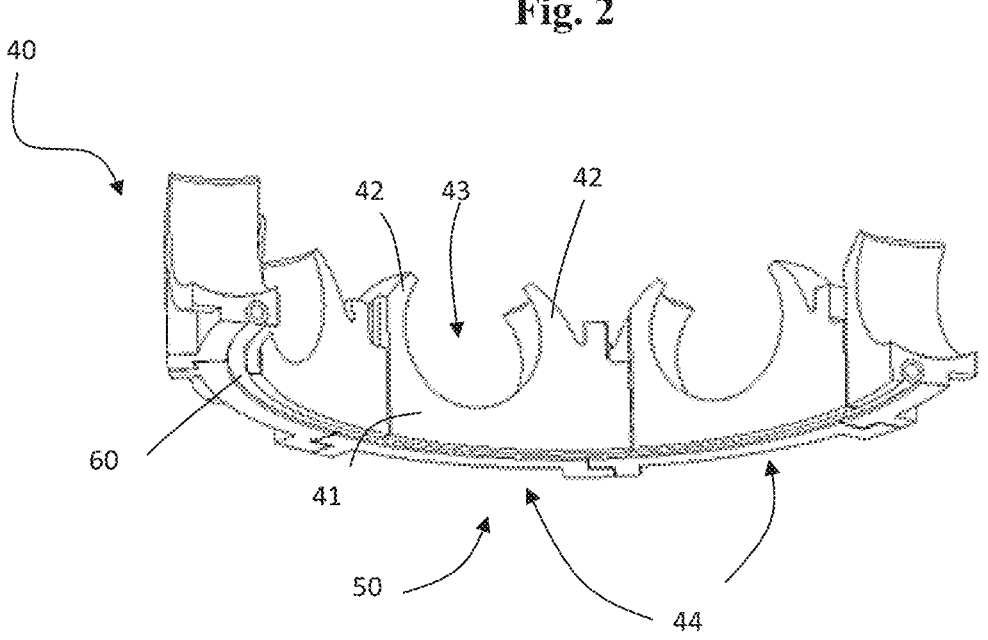
FIG. 3 is a partial axonometric bottom view of the retaining cage in FIG. 2.

Advantageously, when the effect of the misalignment and/or of the axial load is no longer present, the movable sector 50 subjected to these effects can return to the original position thereof. With reference to FIG. 3, the cage 40 may comprise a metal annular elastic element 60 (for example an annular metal spring) that helps to keep the movable sectors in position and helps the movable sector to return to position following the axial movement.

Figure 4:
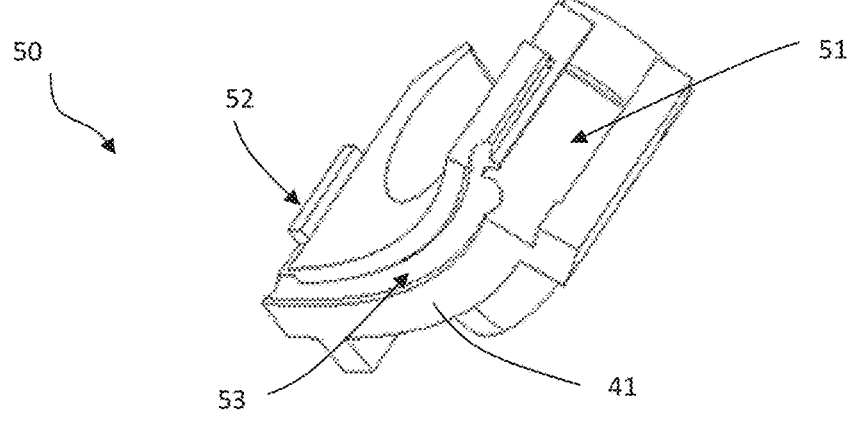
FIG. 4 is a magnified axonometric bottom view of a movable sector of the retaining cage in FIG. 2.

With reference to FIG. 4, the annular elastic element 60 extends circumferentially inside a seat 53 formed in the base rib 41 of each movable sector 50.

Figure 5:
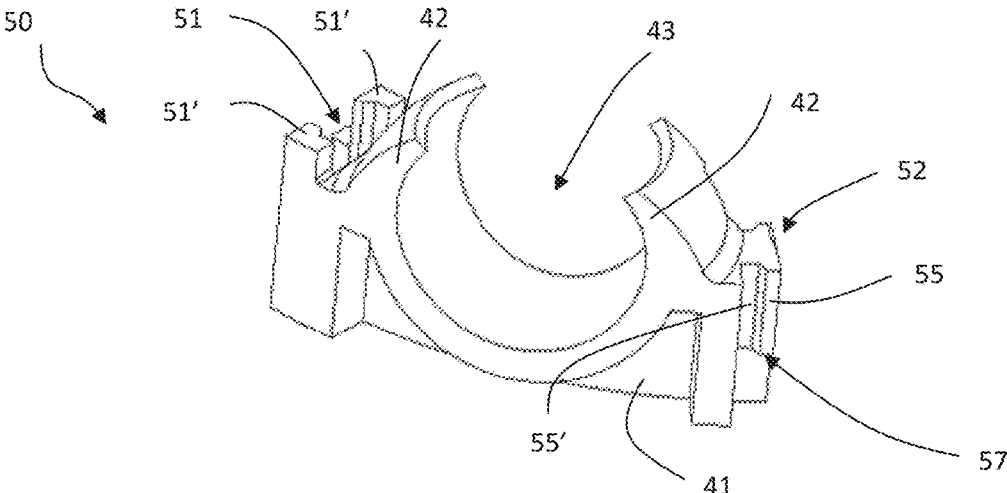
FIG. 5 is a magnified axonometric side view of a movable sector in FIG. 4.
Figure 6:
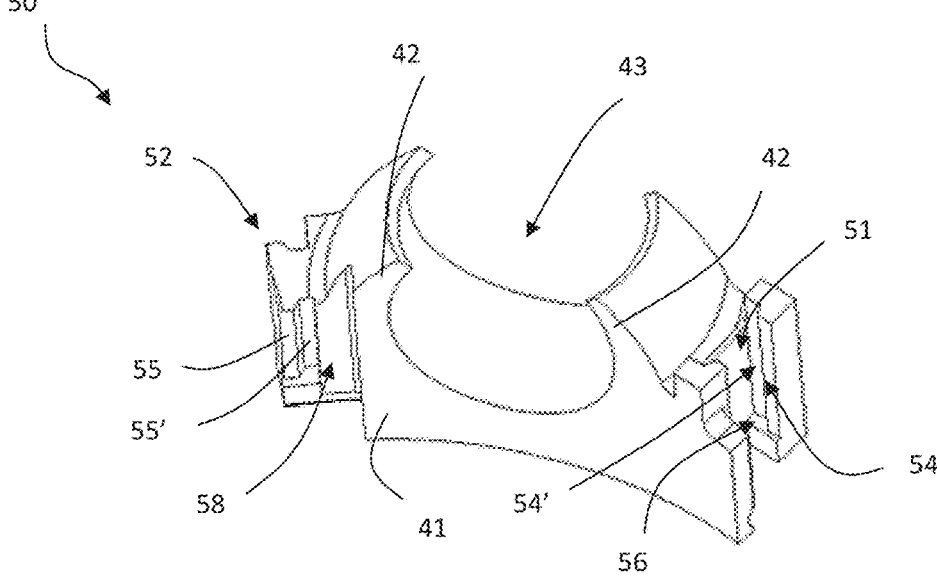
FIG. 6 is a different magnified axonometric side view of a movable sector in FIG. 4.

With reference to FIGS. 5 and 6, the first engagement portion 51 of the dovetail joint between two adjacent movable sectors comprises two shaped uprights 51' facing each other radially and defining an end space 54 and an intermediate space 54', wherein the intermediate space 54' has a radial width greater than the radial width of the end space 54.

On the other hand, the second engagement portion 52 of the dovetail joint comprises an end edge 55 and an intermediate core 55', wherein the end edge 55 has a radial width greater than the radial width of the intermediate core 55'.

The radial width of the end edge 55 of the second engagement portion 52 is almost identical, but for a small radial clearance, to the radial width of the intermediate space 54' of the first engagement portion 51. Similarly, the radial width of the intermediate core 55' of the second engagement portion 52 is almost identical, but for a small radial clearance, to the radial width of the end space 54 of the first engagement portion 51.

The dovetail joint is made by engaging:

the end edge 55 of the second engagement portion 52 in the intermediate space 54' of the first engagement portion 51, and the intermediate core 55' of the second engagement portion 52 in the end space 54 of the first engagement portion 51.

This means that two adjacent sectors are bound together circumferentially, since the end edge 55 of the movable sector cannot come out of the end space 54, which is of lesser radial width.

On the other hand, and as mentioned above, adjacent movable sectors 50', 50" have reciprocal freedom of movement. Such movement should however be limited, and this is achieved by defining an abutment in the axial direction between a first stop surface 56 of the first engagement portion 51 and a second stop surface 57 of the second engagement portion 52. This obviates the risk, despite the presence of the annular elastic element 60, of a movable sector coming away from the remaining "pack" of movable sectors that form the cage.

Advantageously, a radially inner surface 58 of the second engagement portion 52 can be dimensioned to absorb any radial loads transmitted between the first and second engagement portions.

In short, a bearing unit provided with a polymer retaining cage according to the present disclosure that circumferentially connects a plurality of axially movable sectors together substantially reduces the risk of the bearing unit coming out of the polymer cage when the bearing unit is subjected to a high axial load or where there is misalignment between the shaft and the bearing unit.

Furthermore, the disclosed solution does not require any modification of the process of assembling the cage in the bearing unit, and it does not change the dimensions of the frame of the cage compared to the dimensions of a standard polymer cage.

On the other hand, the present solution provides the additional advantage of enabling replacement of individual worn movable sectors instead of the whole cage.

Finally, the axial movement of the movable sector of the cage is kept under control by simple mechanical end-of-travel means and the annular elastic element helps each individual sector affected by the axial movement to return to the original position.

Numerous other variants exist in addition to the embodiments of the present disclosure described above. Said embodiments are provided solely by way of example and do not limit the scope of the present disclosure, its applications or its possible configurations. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A bearing unit having a central rotation axis and comprising:

a radially outer ring;

a radially inner ring;

a row of rolling bodies between the radially outer ring and the radially inner ring; and a retaining cage retaining the rolling bodies, the cage including a plurality of movable sectors, equal to each other, arranged circumferentially adjacent to each other around the central rotation axis, each movable sector having a respective first and a respective second engagement portion for assembly with a relative second and a relative first engagement portion of two circumferentially adjacent movable sectors, each first and each second engagement portion of each movable sector forming a respective circumferential constraint, a respective radial constraint and a respective axial degree of freedom with each second and each first engagement portion of circumferentially adjacent movable sectors.

2. The bearing unit according to claim 1, wherein each movable sector has:

a base rib;

a pair of tenons spaced apart circumferentially and having an arcuate shape; and a recess, defined by the pair of tenons to retain a respective rolling body.

3. The bearing unit according to claim 2, wherein the cage comprises an annular elastic metallic element configured to maintain the plurality of movable sectors in position and to restore, in the presence of an axial movement, the axial position of each movable sector.

4. The bearing unit according to claim 3, wherein the annular elastic metallic element extends circumferentially inside a seat obtained in each movable sector, in correspondence with the base rib.

5. The bearing unit according to claim 4, wherein the first engagement portion comprises two shaped uprights facing each other radially and defining an end space and an intermediate space, wherein the intermediate space has a radial width greater than the radial width of the end space.

6. The bearing unit according to claim 5, wherein the second engagement portion comprises an end edge and an intermediate core, wherein the end edge has a radial width greater than the radial width of the intermediate core.

7. The bearing unit according to claim 6, wherein the radial width of the end edge of the second engagement portion is almost equivalent to that of the intermediate space of the first engagement portion and the radial width of the intermediate core of the second engagement portion is almost equivalent to that of the end space of the first engagement portion.

8. The bearing unit according to claim 7, wherein the first and second engagement portions define an abutment in the axial direction between a first stop surface of the first engagement portion and a second stop surface of the second engagement portion.

9. The bearing unit according to claim 8, wherein the second engagement portion has a radially internal surface configured to absorb radial loads transmitted between the first engagement portion of a first movable sector and second engagement portion of a second movable sector, circumferentially adjacent to the first movable sector.

10. The bearing unit according to claim 1, wherein the cage comprises an annular elastic metallic element configured to maintain the plurality of movable sectors in position and to restore, in the presence of an axial movement, the axial position of each movable sector.

11. The bearing unit according to claim 10, wherein the annular elastic metallic element extends circumferentially inside a seat obtained in each movable sector, in correspondence with the base rib.

12. The bearing unit according to claim 1, wherein the first engagement portion comprises two shaped uprights facing each other radially and defining an end space and an intermediate space, wherein the intermediate space has a radial width greater than the radial width of the end space.

13. The bearing unit according to claim 1, wherein the second engagement portion comprises an end edge and an intermediate core, wherein the end edge has a radial width greater than the radial width of the intermediate core.

14. The bearing unit according to claim 13, wherein the first engagement portion comprises two shaped uprights facing each other radially and defining an end space and an intermediate space, wherein the intermediate space has a radial width greater than the radial width of the end space, and wherein the radial width of the end edge of the second engagement portion is almost equivalent to that of the intermediate space of the first engagement portion and the radial width of the intermediate core of the second engagement portion is almost equivalent to that of the end space of the first engagement portion.

15. The bearing unit according to claim 1, wherein the first and second engagement portions define an abutment in the axial direction between a first stop surface of the first engagement portion and a second stop surface of the second engagement portion.

16. The bearing unit according to claim 1, wherein the second engagement portion has a radially internal surface configured to absorb radial loads transmitted between the first engagement portion of a first movable sector and second engagement portion of a second movable sector, circumferentially adjacent to the first movable sector.

17. The bearing unit according to claim 1, wherein each first and each second engagement portion of each movable sector constrains circumferentially adjacent movable sectors from pivoting with respect to one another.

18. The bearing unit according to claim 1, wherein each first and each second engagement portion of each movable sector forms a dovetail joint with each second and each first engagement portion of circumferentially adjacent movable sectors.

\* \* \* \* \*